United States Patent [19]
Gyory

[11] Patent Number: 5,974,733
[45] Date of Patent: Nov. 2, 1999

[54] GREENHOUSE CONVEYOR SYSTEM AND METHODS

[75] Inventor: Charles K. Gyory, Elkwood, Va.

[73] Assignee: Willow Run Company, Inc., Elkwood, Va.

[21] Appl. No.: 08/560,642

[22] Filed: Nov. 20, 1995

[51] Int. Cl.⁶ ................................................. A01B 79/00
[52] U.S. Cl. .................................. 47/58.1; 47/17; 47/18; 193/38
[58] Field of Search ................................ 47/17, 18, 58.1, 47/39, 65; 193/38

[56] References Cited

U.S. PATENT DOCUMENTS

| | | | |
|---|---|---|---|
| 1,642,329 | 9/1927 | Brown | 193/38 |
| 1,647,665 | 11/1927 | Riche | 193/38 |
| 1,983,806 | 12/1934 | Norman | 47/18 R |
| 2,717,699 | 9/1955 | Spindler | 193/38 |
| 3,020,993 | 2/1962 | Heinrich | 193/38 |
| 3,031,245 | 4/1962 | Phillips | 193/38 |
| 3,034,800 | 5/1962 | Campbell | 280/18 |
| 3,140,878 | 7/1964 | Davis | 280/18 |
| 3,484,801 | 12/1969 | Carlin | 280/18 |
| 3,824,736 | 7/1974 | Davis | 47/65 D |
| 3,869,827 | 3/1975 | Anderson | 47/17 B |
| 4,046,393 | 9/1977 | Vadnais | 280/19 |
| 4,352,256 | 10/1982 | Kranz | 47/17 MS |
| 4,837,971 | 6/1989 | Visser | 47/17 MS |
| 4,930,253 | 6/1990 | Todd | 47/17 MS |

FOREIGN PATENT DOCUMENTS

| | | | |
|---|---|---|---|
| 3207800 | 9/1983 | Germany | 47/17 MS |
| 8101765 | 11/1982 | Netherlands | 47/17 MS |
| 8702635 | 6/1989 | Netherlands | 47/18 |
| 1713496 | 2/1992 | Russian Federation | 47/17 MS |
| 8101495 | 6/1981 | WIPO | 47/18 |

*Primary Examiner*—Michael J. Carone
*Assistant Examiner*—Joanne C. Downs

[57] ABSTRACT

A conveying method and a conveyor for carrying out the method is disclosed for manually moving plant stock around in a greenhouse. The method utilizes an elongated rectangular conveyor with rounded corners and handholds at each end and having the proper mix of rigid and pliable characteristics to allow pulling the conveyor from one bench across an aisle bridged by a stationary conveyor to an adjacent bench or along the length of a bench.

6 Claims, 5 Drawing Sheets

GREENHOUSE CONVEYOR SYSTEM AND METHODS

FIELD OF THE INVENTION

This invention relates to a method for transporting plants in greenhouses using a novel conveyor device, and particularly, to an improved hand-operated conveyor system and method of using it for transporting plants across the surface of benches or between adjacent benches in order to move the plants to a new location or to provide them more space as they grow. Benches are long and aisles are narrow in a typical greenhouse to maximize growing space for plants. The present invention makes it possible to easily transport potted plants or flats across adjoining benches or from one adjacent bench to another.

BACKGROUND OF THE INVENTION

It is common in the nursery business to use greenhouses for germinating and growing plants.

Typically, plants are planted as seeds or cuttings in 11 by 22 inch plastic flats or in pots. Pots are typically 3, 4, or 5 inches in diameter but may be anywhere from 2 to 10 inches in diameter. The plants may be kept in the original flats or pots until sold or, after reaching a certain size, may be transplanted to larger pots to provide sufficient soil volume to support the plant's root system and keep it from getting root bound. If a large plant is desired, several transplantings into larger pots may be appropriate to continually provide the proper soil volume to support the plant. As the plant grows, its foliage takes up a continually larger space, making it necessary to spread individual pots or flats apart to allow sufficient sunlight to reach the foliage. Growing plants in greenhouses therefore requires frequent movement of plants from one location to another, such as from the potting shed to the germinating greenhouse, and from one area of a particular greenhouse to another to accommodate sunlight demands of the growing foliage.

A majority of greenhouses employ benches to provide a platform for laying out plants and keep the stock elevated above the floor. Benches are typically constructed of steel, wood, plastic, or concrete frames with galvanized expanded metal, turkey wire, or special bench fabrics spread across the top. Galvanized expanded metal or other bench surfaces allow water to drain from the plants during frequent watering.

A bench is typically 3.5 to 7 feet wide by as long as needed. The bench surfaces are 16 to 36 inches above ground level to bring them to a comfortable work level for personnel. Most frequently, benches do not have a rim around the outer perimeter of the top surface. For those that do have a rim, it is frequently a fairly short lip.

As it costs a great deal of money to heat a large volume of air, space is at a premium in greenhouses. A bench would typically be 60 to 100 feet long or even longer. As many rows of benches as possible are fitted in each greenhouse to maximize the growing space available to plants and the aisles between the rows of benches are typically kept very narrow, usually from 16 to 20 inches wide. These narrow aisles make it difficult to transport potted plants or flats during the many times they are rotated within a greenhouse or from one greenhouse to another. A main aisle, measuring 8 to 12 feet wide, may be created within the greenhouse to allow carts or an overhead track system access to the ends of the benches in the greenhouse.

Methods currently used by greenhouses to transfer plants include the use of portable conveyors. The conveyors are typically in multiple sections with each section being ten to twelve feet long. One section, the drive section, is motorized and quite heavy. The other conveyor sections connect to the drive section through a gear mechanism at each junction. The main unit, the drive section, is quite heavy and becomes quite awkward to move around. The other conveyor sections, typically constructed of aluminum, are not very heavy but are still awkward to move down the benches. It requires two persons to hook the conveyor sections together and the maximum practical conveying distance with one drive unit is about 80 feet.

The conveyor is typically configured with all its sections in place and sections are removed and the conveyor shortened as the benches are filled with plants. The conveyor is typically laid on top of a bench near one aisle and two benches are therefore filled with plants as subsequent sections of the conveyor are removed.

The type of time and effort required to lay out and connect the sections of the conveyor and then remove sections as the benches are filled in the type of effort most greenhouse operators have found does not pay. Most greenhouses have found that it is easier and more efficient to just let people carry the flats or potted plants. One person can typically carry only one or two flats at a time, and perhaps four to eight pots at a time, depending on the size of the pots. Therefore there is typically a lot of labor involved in moving plants around in a greenhouse, and multiple trips must be made up and down the aisles to distribute the plants on the benches.

Greenhouse operators have automated the filling process of the pots or flats; they've automated the movement of the plants through the main aisles of the greenhouses, which can be quite a distance at times, by the use of carts or overhead conveyors. However, the time consuming portion of moving plants around greenhouses which involves the movement of the plants onto, off of, and around the benches themselves, because of the narrow aisles and the large expanse that would be required to install a mechanized conveyor system, have prevented full automation.

Accordingly, the present art has not proven fully satisfactory in providing an arrangement has not proven fully conveying flats or potted plants within greenhouses.

SUMMARY OF THE INVENTION

This invention consists of a hand operated conveyor device and a method of using the device to transport flats or potted plants within greenhouses. The hand operated conveyor may be referred to as a conveyor.

The hand operated conveyor consists of a lightweight sheet typically constructed of ⅛ inch thick white high density polyethylene. The conveyor is rectangular in shape with hand holds cut in either end. The conveyor may have smooth surface son the top and bottom or may have a matte top surface to prevent pots or flats from slipping therefrom. The corners of the rectangular conveyor are rounded to prevent them catching on edges of the benches.

The method of this invention consists of using the conveyor to transport planted pots or flats within greenhouses. The conveyor is first positioned on a bench top near the planted pots or flats that are to be moved. Pots or flats are then placed on the top of the conveyor. The conveyor can accommodate up to 16 potted plants or seven or eight planted flats or some combination of pots and flats. The flats may be stacked if the weight and foliage permits. The conveyor is then grabbed by a handhold and pulled down the bench on its top surface until it is near the desired off loading position for the plants. The loaded conveyor may also be pulled from one bench surface to another adjacent bench surface by bridging the gap created by the aisle between the benches with another conveyor, or board, or other similar material. When the plants are all offloaded, the conveyor may be pulled again to the loading position without turning the conveyor around by grasping the opposite handhold or the conveyor may be folded in two lengthwise and carried to the loading position by holding both halves of the conveyor through the two handholds. By continuing in this manner, the entire surface of two adjacent benches having a small aisle between them may be filled with plants by repeatedly loading the conveyor with plants, pulling the conveyor to the desired off load position, off loading the plants onto the bench's top surface, and returning the conveyor to the loading position. When complete with the two adjacent benches, the conveyor can be easily transported to another set of adjacent benches. In this manner, all bench surfaces in a greenhouse may be filled by using the device and method of this invention.

OBJECTS AND ADVANTAGES

One object of the present invention is to provide a manually operated conveyor and a method for using the conveyor to transport plants in greenhouses. An object of using the method to transport plants is to increase greenhouse worker productivity on the order of a factor of four.

A second object is to provide a conveyor that can hold several planted pots or planted flats. Another object is to provide a conveyor that easily slips across bench tops in greenhouses.

Still another object of the invention is to provide a conveyor that is rigid enough to bridge the aisles between adjacent benches with the aid of another conveyor used as a bridge while loaded with planted pots or flats and at the same time pliable enough to flex over any small lip at the edge of the bench tops without causing spillage of the load.

Another object of the present invention is to provide a conveyor that is easy to store by hanging up or folding in two. Other objects of the invention include providing a conveyor that does not easily mildew, is economical, can be easily cleaned by hosing down with water, and can withstand being wetted many times by water.

Another object is to provide a conveyor that provides secure hand holds at each end such that an operator may grip it at either end and pull it in either direction.

Other objects and advantages of the present invention will become apparent when reading the following description of the invention in accompaniment with the included drawings.

DESCRIPTION OF THE INVENTION

The invention is a manually operated conveyor and method and system for using the conveyor to transport plants within greenhouses.

Figure 1:
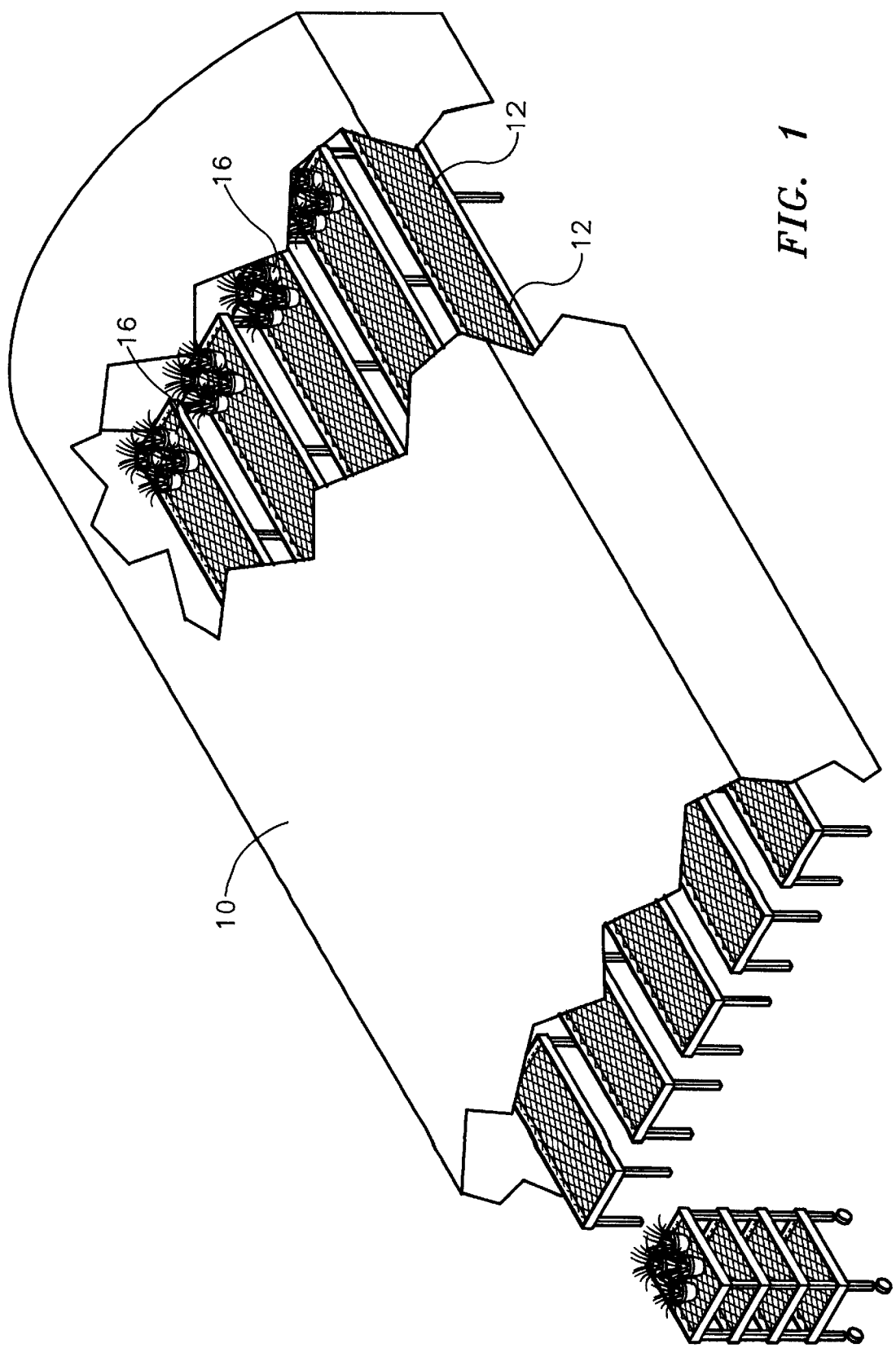
FIG. 1 is a schematic cutaway view of a greenhouse showing benches and some potted plants arranged on the benches.

FIG. 1 is a cutaway view of a greenhouse 10 showing benches 12 and some potted plants 16 arranged on the benches. Greenhouses typically use benches for holding plants. The plants are usually planted in either flats or pots in the potting building. They are then usually moved on a movable cart or a mechanized vehicle to a greenhouse 10. The plants may first be offloaded onto a multilevel bench or wheeled cart 14 as shown in FIG. 1 prior to offloading onto the stationary benches 12 in the greenhouse 10. Space is at a premium in a greenhouse. All of the expenses incurred in operating a greenhouse and any possible profits from its operation relate directly to the effective use of the available space within the greenhouses. Using space effectively reduces the heating and watering costs per unit grown. To make effective use of space, greenhouses typically provide as much bench space as possible within each building.

Typically, a greenhouse 10 is filled with benches 12, as shown in FIG. 1. An individual bench measures 3.5 to 7 feet wide by as long as appropriate. The benches typically measure 60 to 100 feet long or longer. To maximize growing space, the small aisles 34 between the benches 12 are kept narrow, typically 16 to 20 inches.

As the aisles are narrow, it is impractical to build a cart or mechanized vehicle that can carry a sufficiently sized load through the aisles. Mechanized conveyor systems are bulky, hard to handle, and require frequent manipulations of the number of sections added or removed to deliver the pots or flats to the proper bench area.

Figure 2:
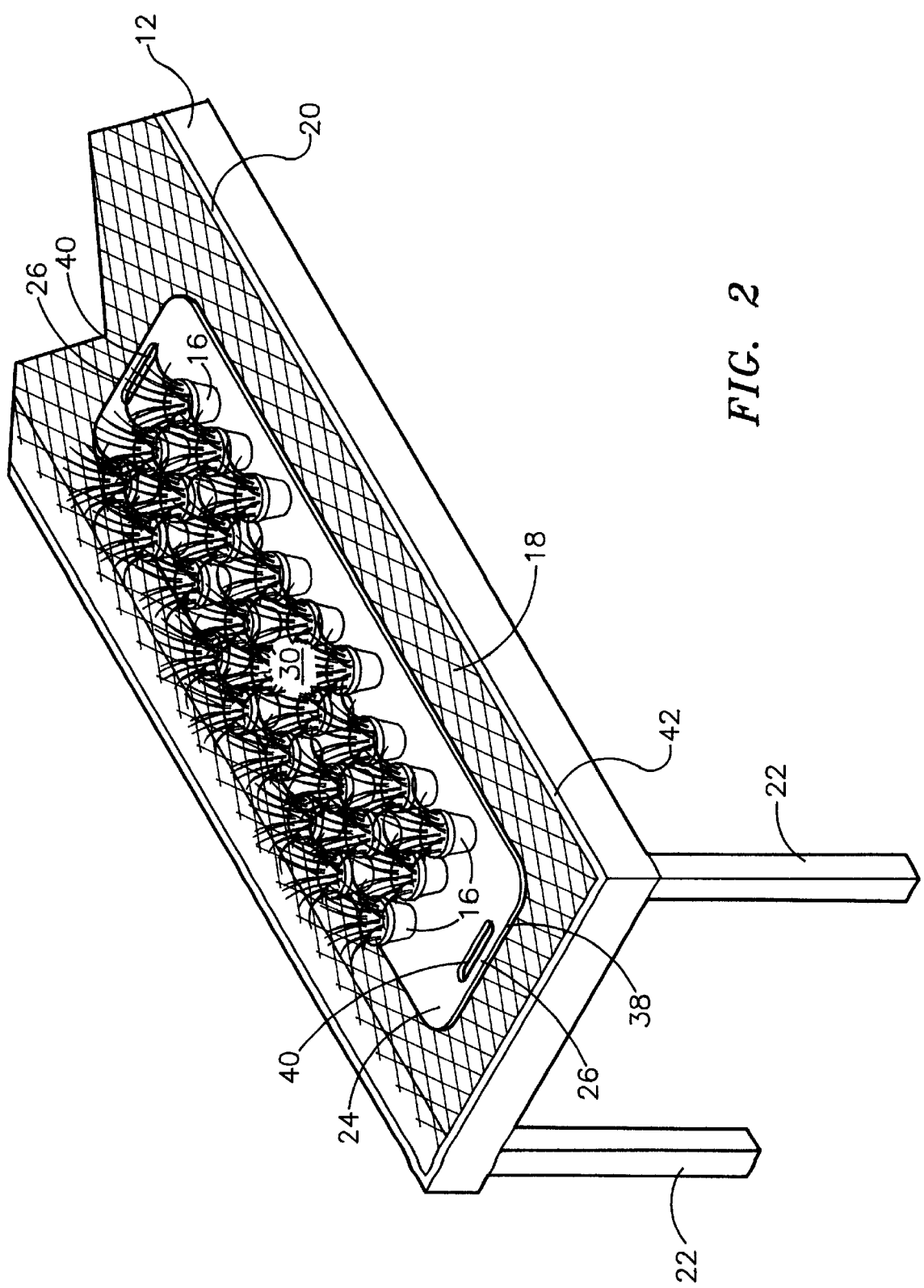
FIG. 2 is a perspective view of the conveyor of this invention holding some potted plants and situated on the top of a bench of the type typically used in greenhouses.
Figure 3:
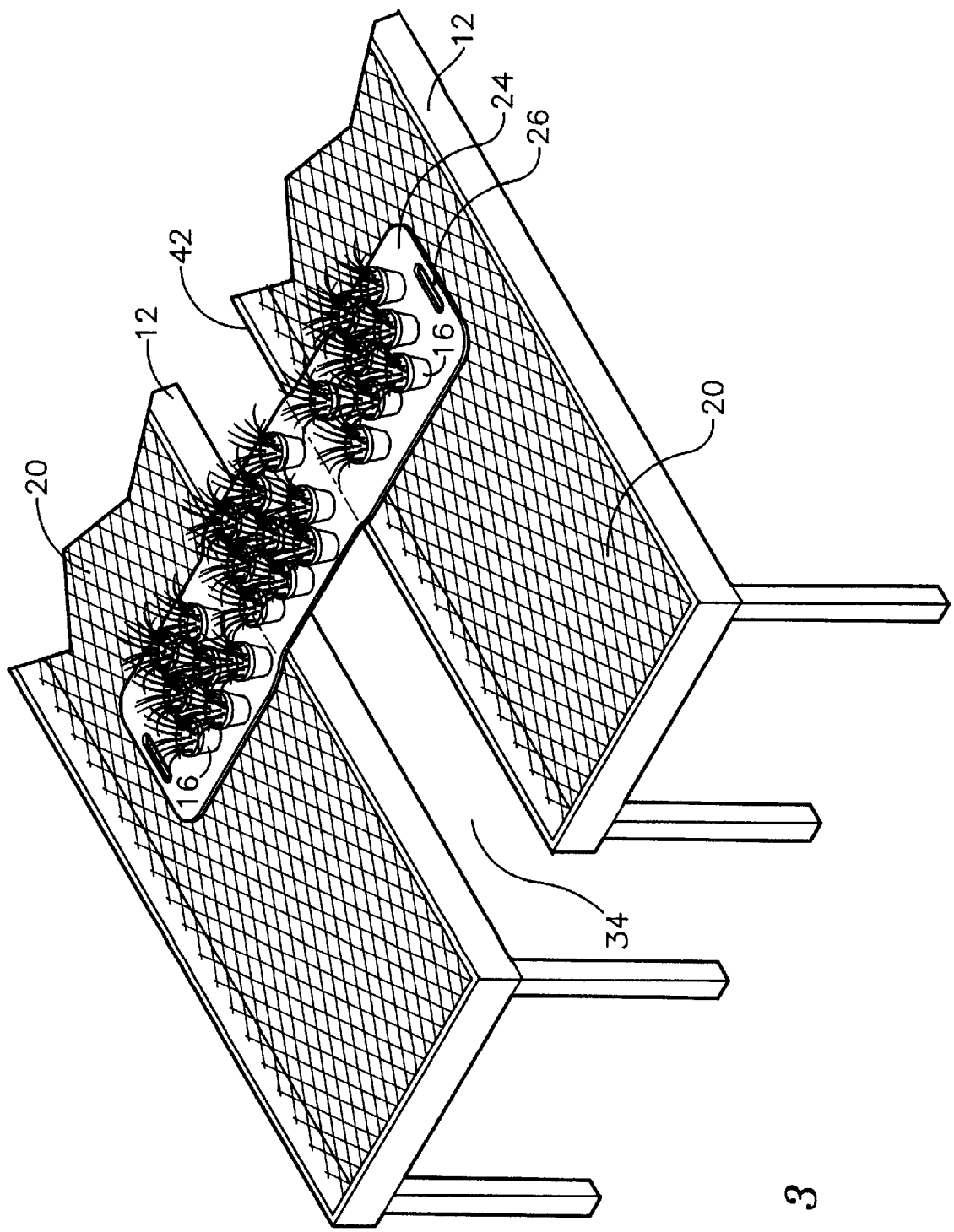
FIG. 3 is a perspective view of two adjacent benches with the conveyor of this invention bridging the aisle between the adjacent benches.

FIG. 2 is a perspective view of the conveyor 24 of this invention holding some potted plants 16 and situated on the top of a bench 12 of the type typically used in greenhouses. The rectangular shaped conveyor 24 is typically 24 inches wide but may be from 22 to 29 inches. The length of a conveyor is typically 8 feet but may be from 7 to 10 feet. The conveyor is typically constructed of ⅛ inch thick high density polyethylene but may be from 0.010 to 0.150 inches thick. Two handholds 26 are provided by cutting slots 40 in each end of the conveyor 24. The handholds measure typically 1.75 inches wide from the end 38 of the conveyor to the near edge of the slot 40 but may vary from 1.25 to 2 inches. The slots 40 typically measure 8.00 inches long but may vary from 6 to 10 inches. The top surface 30 of the conveyor may be smooth or rough but preferably both the bottom and top surfaces are smooth with either surface being suitable for holding the pots or flats containing plants. The typical greenhouse bench 12 shown in FIG. 2 has legs 22, a bench top 18, and a top edge 20 which usually does not but may have a slight lip 42 extending upward vertically above the bench top 18. The bench top 18 is typically galvanized expanded metal but may also be turkey wire or special bench fabrics. The conveyor 24 may be filled with pots or flats and placed on a bench as shown in FIG. 2 and then may be grasped by the handhold 26 and pulled to the other end of the bench on its smooth bottom. The bottom surface of the conveyor is preferably smooth to allow it to slide easily across the benches. The conveyor may also be pulled from one row of benches across a small aisle to another row adjacent to it as shown in FIG. 3. If the aisle is wide, then an additional stationary conveyor or piece of plywood can be used as a bridge. The inherent stiffness of the conveyor is sufficient for this procedure but is still flexible enough to permit the leading end, which is being pulled, to elevate for ease of handling. In this manner, pulling plant stock down benches and across aisles to adjacent benches, plant stock may be moved from the main aisle of the greenhouse where it typically is delivered on a wheeled cart to the bench space at the remote or opposite end of the greenhouse.

As shown in FIG. 3, the conveyor 24 of this invention can usually bridge the small aisle 34 between adjacent benches 12. If the aisle is too wide, additional support can be provided by a stationary piece of plywood or a second conveyor (not shown) under the conveyor 24 to act as a bridge. The conveyor 24 is rigid enough to support the plants without letting an end turn downward and spill the plants. The conveyor 24 is also pliable enough to allow it to flex over a small lip 42 which may exist on the top edge 20 of the bench 12. As the conveyor 24 is constructed with the proper mix of rigidity and pliability, pots or flats riding on the conveyor 24 are not tipped over when the conveyor under them traverses the lip 42. A slight bulge 44 is shown in the conveyor 24 at the point where it traverses the lip 42 of each bench 12.

Figure 4:
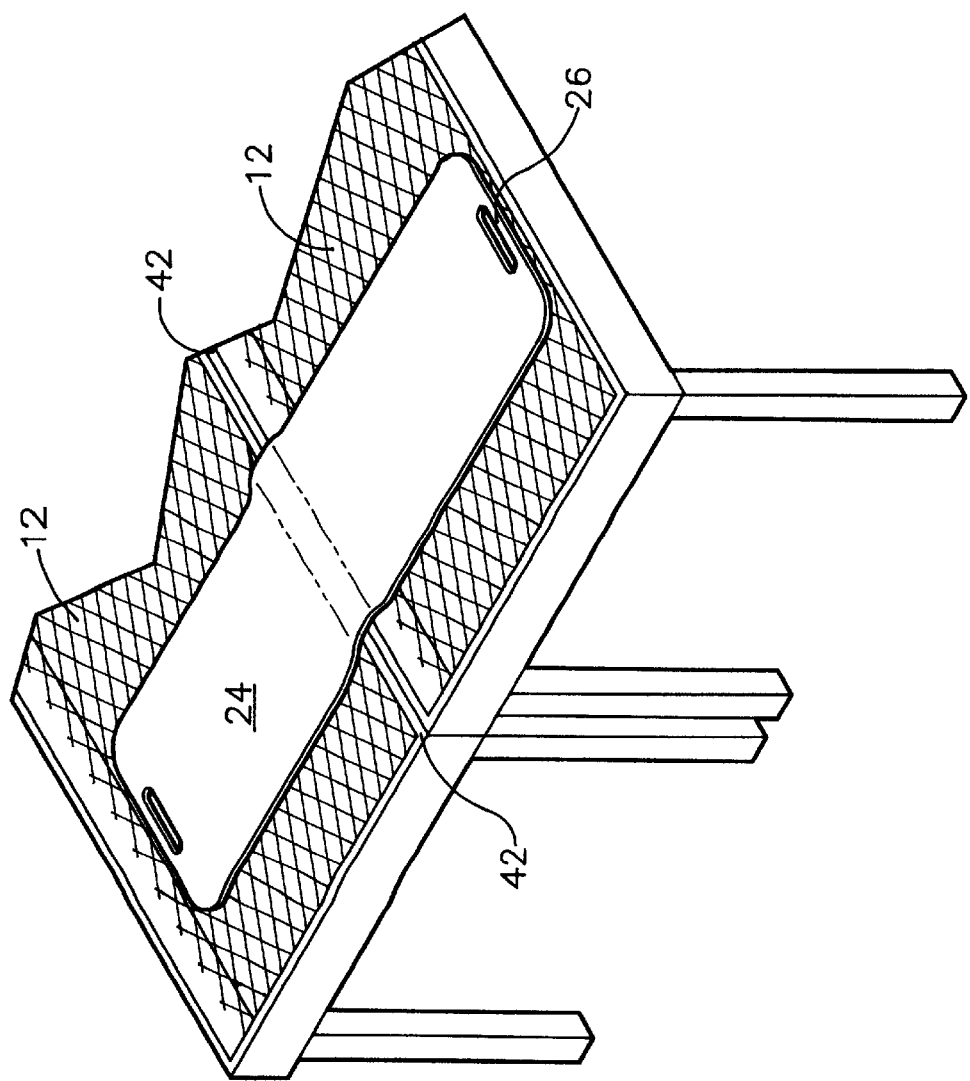
FIG. 4 is a perspective view of two adjacent benches which have been pushed together with the conveyor of this invention bridging the lip on the edge of each bench.

FIG. 4 is a perspective view of two adjoining benches 12 with the conveyor 24 of this invention bridging the lip 42 on the edge of each bench 12.

Figure 5:
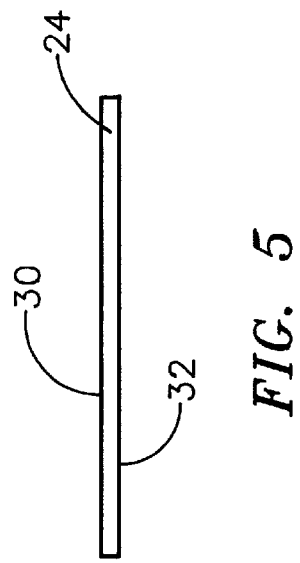
FIG. 5 is an end view of the conveyor with the view from both ends being identical.

FIG. 5 is an end view of the conveyor 24. The preferred material of construction of the conveyor 24 is ⅛ inch thick white high density polyethylene readily available in rolls from industrial supply houses. The top 30 and bottom 32 surfaces of the conveyor 24 are shown.

Figure 6:
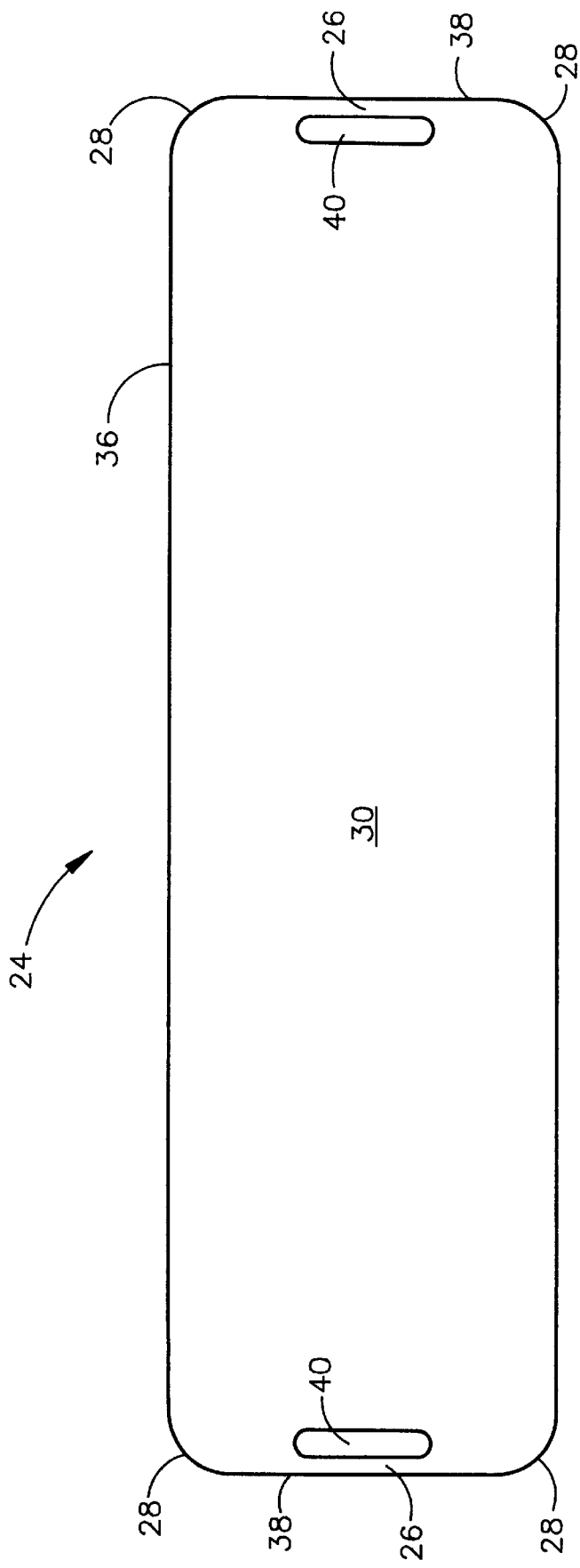
FIG. 6 is a top view of the conveyor with the bottom view being identical.

FIG. 6 is a top view of the rectangular shaped conveyor 24 including the handholds 26 formed by the slots 40 near each end 38 of the conveyor. The sides 36 of the conveyor 24 are straight to reduce the possibility of the sides catching on the bench tops. The corners 28 of the conveyor 24 are rounded with a typical 2 inch radius to minimize the possibility of a corner catching on the top surface of the benches. The top surface 30 of the conveyor may be smooth or rough but is preferably smooth as is the bottom.

Figure 7:
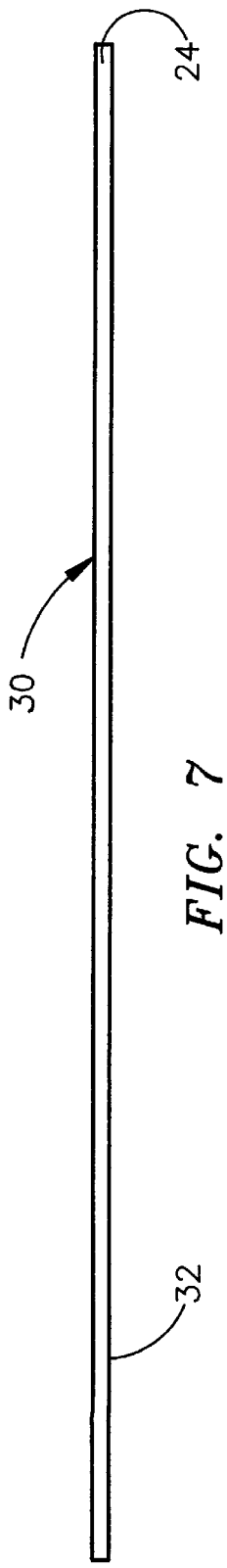
FIG. 7 is a side view of the conveyor with the opposite side view being identical.

FIG. 7 is a side view of the conveyor 24. The length of the conveyor is typically 8 feet. The bottom surface 32 of the conveyor is typically of a smooth texture to enable the conveyor 24 to slide easily over the bench tops.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A method of transporting pots or flats within a greenhouse including the steps of:
    (1) providing a greenhouse having a plurality of elongated elevated benches having at least one end adjacent a main aisle and having a narrow aisle alongside;
    (2) providing a flat flexible rectangular plastic sheet conveyor having a top surface and a smooth bottom surface and a handhold in each end;
    (3) placing said conveyor on one of said greenhouse benches;
    (4) loading said pots or flats on said top surface of said conveyor;
    (5) grasping one of said handholds;
    (6) pulling said conveyor along the top surface of said greenhouse bench to advance said conveyor containing said pots or flats until a desired location is reached;
    (7) removing said pots or flats from said conveyor and placing them on said bench in the desired location;
    (8) returning the empty conveyor back to the loading location; and
    repeating steps 4 to 7 until a desired number of pots or flats have been moved to the desired location on the bench surface.

2. The method of claim 1 wherein said conveyor is a flat flexible rectangular plastic sheet between 0.10 and 0.15 inches thick, 22 to 29 inches wide, and 7 to 10 feet long and having four rounded corners, two ends, two sides and a bottom and a top.

3. The method of claim 2 wherein said handholds are slots centered between the two sides of said conveyor and located 1.25 to 2 inches from each of said ends with said slots being approximately 1.5 to 2 inches wide and 6 to 10 inches long.

4. The method of claim 1 including:
    moving said conveyor with a load of pots or flats from one bench to an adjacent bench by pulling said conveyor from said one bench to said adjacent bench.

5. The method of claim 1 including:
    moving said conveyor with a load of pots or flats from one bench across an aisle to an adjacent bench by pulling said conveyor from said one bench across said aisle to said adjacent bench with the aid of another conveyor used as a bridge.

6. A method for conveying containers within a greenhouse including the steps of:
    providing a conveyor comprising a rectangular sheet having a top surface and a bottom surface, said conveyor being a flat flexible rectangular plastic sheet between 0.10 and 0.15 inches thick, 22 to 29 inches wide, and 7 to 10 feet long and having four rounded corners, two ends, two sides and a bottom and a top, said conveyor including a handhold for manually pulling said conveyor centered between said sides and located 1.25 to 2 inches from each of said ends with said handholds being approximately 1.5 to 2 inches wide and 6 to 10 inches long, said bottom having a smooth surface;
    loading containers for plants onto said conveyor; and
    pulling said conveyor from the loading location to an unloading location.

* * * * *